June 5, 1962 J. MONTEMURRO 3,038,081

TRANSDUCER

Filed Dec. 19, 1960

INVENTOR
JOSEPH MONTEMURRO
BY [signature]
ATTORNEY

United States Patent Office 3,038,081
Patented June 5, 1962

3,038,081

TRANSDUCER

Joseph Montemurro, Whitestone, N.Y., assignor to General Telephone and Electronics Laboratories, Inc., a corporation of Delaware Filed Dec. 19, 1960, Ser. No. 76,681
6 Claims. (Cl. 250—213)

Figure 1:
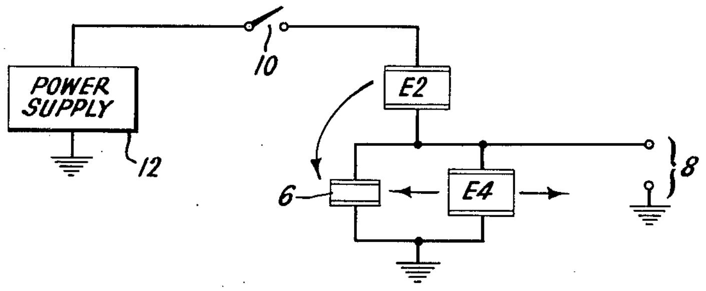

My invention relates to electro-optical transducers.

Electro-optical transducers, i.e. transducers for converting electrical signals into burts of light, have a wide range of applications in the electronic arts. Known electro-optical transducers require active electrical components such as tubes or transistors and further require a direct voltage power source.

In contradistinction I have invented a new type of electro-optical transducer which uses no active components. In addition, since my transducer is adapted to receive power from an alternating voltage source, no direct voltage source is required.

Accordingly, it is an object of my invention to provide a new and improved electro-optical transducer of the character indicated.

Another object of my invention is to provide a new and improved electro-optical transducer employing only passive electrical components.

Still another object of my invention is to provide a new and improved electro-optical transducer incorporating electroluminescent cells and photoconductive elements as passive electrical components and adapted to receive power from an alternating voltage source.

These and other objects of my invention will either be explained or will become apparent hereinafter.

In accordance with the principles of my invention, first and second electroluminescent cells are connected in series between first and second terminals. A photoconductive element is shunted across the second cell, this element being optically coupled to both electroluminescent cells.

Initially both cells are deenergized and dark. The photoconductive element is not illuminated and consequently is in its dark high impedance state. Further, the total impedance of the second cell and the photoconductive element is higher than that of the first electroluminescent cell alone (as long as both cells are dark). When an alternating voltage is applied between the first and second terminals, initially the voltage drop across the second cell is larger than that across the first cell and the second cell begins to emit light. (The first cell is essentially dark.) This light illuminates the photoconductive element and its impedance is reduced. As the impedance of the photoconductive element decreases, the overall impedance of the parallel network relative to that of the first cell decreases, and a larger fraction of the total applied voltage appears across the first cell, and the first cell begins to emit light. This light also illuminates the photoconductive element, and the photoconductor impedance decreases still further. This process continues until the second cell is essentially dark and the first cell is fully lit. At this point, due to the optical coupling between the first cell and the photoconductor element, the first cell will remain lit and the second cell will remain essentially dark until the applied voltage is removed. Removal of this voltage fully extinguishes both cells and returns the circuit to its initial state.

As a result of this type of action, the light emitted from the second cell rises from zero to a maximum value and then decays to a minimum, thus producing the desired burst of light.

Figure 2A:
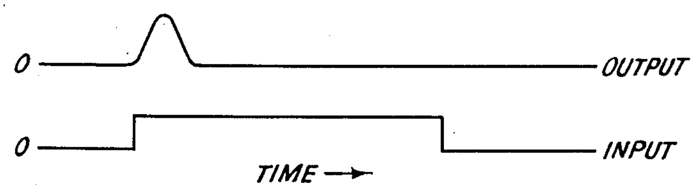
Figure 2B:
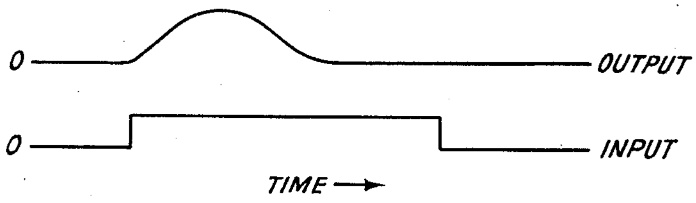

An illustrative embodiment of my invention will now be described with reference to the accompanying drawings wherein:

FIG. 1 shows an arrangement of two electroluminescent cells and a photoconductor element in accordance with my invention;

FIG. 2*a* illustrates the electro-optical relationship between the burst of light and the applied voltage when the photoconductor element is of the cadmium selenide type; and FIG. 2*b* illustrates the electro-optical relationship between the burst of light and the applied voltage when the photoconductor element is of the cadmium sulfide type.

Referring now to FIG. 1, first and second electroluminescent cells E2 and E4 are connected in series with switch 10 across an alternating voltage power supply 12. A photoconductor element 6 is shunted across the second cell E4. Element 6 is optically coupled to both cells E2 and E4 and is masked from ambient light. A pair of output terminals 8 are connected across cell E4.

As has been pointed out previously, the impedance of the parallel network formed by cell E4 when dark and element 6 when in the dark is higher than that of cell E2 when dark.

When switch 10 is closed an alternating voltage for example having a r.m.s. value of 200 volts and a frequency of 60 c.p.s. is applied across the cell and the parallel network. Due to the impedance relationships previously indicated, a major fraction of the applied voltage appears across the network and cell E4 is energized and emits light. (Cell E2 is either completely dark or is so dim that it can be regarded as essentially dark.) Consequently, element 6 is illuminated and the photoconductor impedance decreases. This decrease causes a decrease in the impedance of the parallel network and, in turn, this decrease in network impedance causes a larger fraction of the applied voltage to appear across cell E2 and a smaller fraction to appear across the network. This redistribution of voltage produces a reduction of the intensity of the light emitted by cell E4 and at the same time cell E2 is energized and emits light. The light emitted from both cells illuminates element 6 causing a further reduction in the photoconductor impedance with a consequent increase in the intensity of the light emitted from cell E2 and decrease in the intensity of the light emitted from cell E4. This regeneration process continues until cell E2 is fully lit and cell E4 is either fully dark or is extremely dim. Since the light from cell E2 continues to illuminate element 6, the cells E2 and E4 remain lit and dark respectively until switch 10 is opened and the circuit is deenergized.

The light output of cell E4 thus rises from zero at the time the switch is closed to a maximum and then decays to a minimum, thus producing the desired burst of light. In addition, the voltage appearing across cell E4 also rises from zero to a maximum and then decays so a voltage pulse is produced and will appear across output terminals 8.

The cells E2 and E4 can comprise two spaced apart electrodes at least one of which permits the passage of light therethrough, and an electroluminescent layer including an electroluminescent phosphor therebetween. Electrically these cells represent luminous capacitors. Element 6 can comprise two spaced apart suitable electrodes and a photoconductive layer in between.

The desired impedance relationships can be established, for given materials and electrode spacings, by varying the relative area ratios of the cell electrodes. If the area of the cell can not be changed in an existing circuit, a standard commercial capacitor can be used to alter the impedance for example by connecting this capacitor in parallel with cell E2. Typical ratios can be as follows: The area ratios between E2 and E4 can be 2:1 respectively. A typical photoconductive element used with the above will have a dark impedance about ten times as high as that of E4 and an illuminated impedance about one tenth as large as that of E4.

The direction and the wave form of the burst of light emitted from cell E4 can be altered by changing the various capacitances of the circuit relative to each other. In addition, however, the duration and wave form of the light burst can be varied by varying the photoconductor material used. For example, when cadmium selenide is used, the light burst characteristics will be as shown in FIG. 2*a*, whereas if cadmium sulfide is used, the light burst characteristics will be as shown in FIG. 2*b*.

What is claimed is:

1. In combination, first and second terminals; first and second electroluminescent cells connected in series between said terminals; and a photoconductor element shunting said second cell and optically coupled to both of said cells.

2. In combination, first and second terminals; first and second electroluminescent cells connected in series between said terminals; a photoconductor element shunting said second cell and optically coupled to both of said cells; and switching means which, when actuated, applies a voltage between said terminals and, when deactuated, removes said voltage from said terminals.

3. In combination, first and second terminals; first and second electroluminescent cells connected in series between said terminals; a photoconductor element shunting said second cell and optically coupled to both of said cells, the total impedance of said second cell and shunting element being higher than that of said first cell when said element is in the dark and being much lower than that of said first cell when said element is illuminated.

4. An electro-optical transducer comprising first and second series connected electroluminescent cells, and a photoconductor element shunting said second cell and optically coupled to both of said cells, the overall impedance of said element and shunted second cell being higher than that of said first cell when said element is in the dark and being much lower than that of said first cell when said element is illuminated.

5. An electro-optical transducer comprising first and second series connected electroluminescent cells, a photoconductor element shunting said second cell and optically coupled to both of said cells, the overall impedance of said element and shunted second cell being higher than that of said first cell when said element is in the dark and being much lower than that of said first cell when said element is illuminated, and means to apply a voltage across said series connected cells whereby a burst of light is emitted from said second cell and thereafter said first cell is fully lit and said second cell is essentially dark.

6. An electro-optical transducer comprising first and second series connected electroluminescent cells, a photoconductor element shunting said second cell and optically coupled to both of said cells, the overall impedance of said element and shunted second cell being higher than that of said first cell when said element is in the dark and being much lower than that of said first cell when said element is illuminated, a pair of output terminals connected across said second cell; and means to apply a voltage across said series connected cells whereby said second cell emits a burst of light and a voltage pulse appears across said output terminals.

No references cited.